United States Patent [19]

Wouch et al.

[11] Patent Number: 5,747,555
[45] Date of Patent: May 5, 1998

[54] WATER-BASED PUBLICATION GRAVURE INK

[75] Inventors: Gerald Wouch, Kalamazoo, Mich.; Gary Procknow, Chicago, Ill.

[73] Assignee: R. R. Donnelley & Sons Co., Lisle, Ill.

[21] Appl. No.: 629,829

[22] Filed: Apr. 10, 1996

Related U.S. Application Data

[63] Continuation-in-part of Ser. No. 576,835, Dec. 21, 1995, abandoned, which is a continuation of Ser. No. 392,093, Feb. 22, 1995, abandoned.

[51] Int. Cl.$^6$ .................................................. C09D 11/10
[52] U.S. Cl. ..................... 523/161; 524/538; 524/606; 524/607; 524/608; 260/DIG. 38; 106/31.13
[58] Field of Search .......................... 523/161; 524/606, 524/607, 608, 538; 260/DIG. 38; 106/20 R

[56] References Cited

U.S. PATENT DOCUMENTS

| | | | |
|---|---|---|---|
| 4,154,618 | 5/1979 | Burke | 106/27 B |
| 4,722,963 | 2/1988 | Whyzmuzis | 524/606 |
| 4,820,765 | 4/1989 | Whyzmuzis | 524/606 |

OTHER PUBLICATIONS

Victor Strauss, The Printing Industry, pp. 26–27 (1967).

*Primary Examiner*—Vasu Jagannathan
*Assistant Examiner*—John J. Guarriello
*Attorney, Agent, or Firm*—Wood, Phillips, VanSanten, Clark & Mortimer

[57] ABSTRACT

A method of making a water-based publication gravure ink is provided wherein a polyamide resin or a mixture of the polyamide resin and a second resin is ground to produced a ground resin, and then the ground resin is mixed with water, a base, and a colorant. The resin/water/base/colorant mixture is then milled to produce a color dispersion, which is then mixed with an emulsion and water to produce a press-ready ink. Preferably, the water, the base and a dispersant are mixed first, and then combined with the colorant to produce a colorant slurry. The colorant slurry is then mixed with the ground resin, and milled to produce a slurry color dispersion. Also provided are water-based publication gravure inks made according to the methods outlined above, and a water-based publication gravure ink including water, a colorant, a mixture of a polyamide and a resin other than the polyamide resin, a base, and a dispersant.

7 Claims, No Drawings

WATER-BASED PUBLICATION GRAVURE INK

This is a continuation-in-part of application Ser. No. 08/576,835, filed Dec. 21, 1995, now abandoned which is a continuation of application Ser. No. 08/392,093, filed Feb. 22, 1995, now abandoned.

FIELD OF THE INVENTION

This invention relates to a water-based publication gravure ink. More particularly, the invention relates to a process of making a water-based publication gravure ink having a water dispersible/soluble polyamide resin and to the product of that process. Additionally, the invention relates to a waterbased publication gravure ink having a mixture of a water dispersible/soluble polyamide resin with a resin other than the polyamide resin and to a method of making such an ink.

BACKGROUND OF THE INVENTION

Gravure is a major commercial printing process used to print everything from black and white text on newsprint to fine art color images on a substrate such as paper. As opposed to letterpress (wherein an ink is transferred to a substrate from a raised typeset), lithography (wherein an ink is transferred to a substrate having areas which are ink-receptive and inkrepellant), and flexography (wherein an ink is transferred to a substrate from a flexible molded rubber plate with a raised printing area), gravure is an intaglio process, wherein an ink is transferred to a substrate as drops from very small cells that are recessed into a printing surface, e.g., a cylinder or a flat plate. The quality of the text or image is directly influenced by the flow of the ink drops as they spread outward on the substrate to form the text or image. If the surface tension of the ink drop is too high, the ink will not spread quick enough or far enough, causing the print to appear rough and grainy.

Consequently, gravure inks are commonly prepared as very fluid, organic solvent-based inks to obtain a sufficiently well-distributed film of resin and colorant on the substrate. Representative organic solvents include toluene, xylene, alcohols, acetone, aliphatic hydrocarbons and the like, and mixtures thereof.

Unfortunately, unlike solvents such as water, organic solvents, such as toluene and xylene, are classified as volatile organic compounds (VOC). Because VOCs such as toluene are hazardous air pollutants and have been known to cause considerable damage to the environment, significant limitations have been placed on the amount of VOC emissions that can be released as a by-product during printing in general, and during publication gravure printing in particular.

A gravure ink may be classified as either a publication ink or a packaging ink. Packaging gravure inks are used in low quality printing such as food boxes with no overprinting (packaging gravure inks are not suitable for overprinting) and low printing line speeds of no more than about 700 feet per minute. Images printed with packaging gravure inks appear cartoon-like. Publication gravure inks, on the other hand, are used for high quality color printing, such as for magazines, which involves tonal contrasts, overprinting and high printing line speeds of about 2,000 to about 3,000 feet per minute. Publication gravure inks are used in a three or four color process and produce life-like images.

Title 40 of the United States Code of Federal Regulations, part 60, subpart QQ places severe restrictions on VOC emissions from publication gravure inks, mandating that no publication gravure ink may emit more than 16% by weight of the total mass of the input solvent. By contrast, the Environmental Protection Agency (EPA) permits packaging gravure inks to emit a higher percentage of their total mass than publication gravure inks (which results in rapid drying of the packaging gravure inks).

One response to the strict EPA regulations on VOC emissions from publication gravure inks has been to use organic solvent recovery systems or incinerators to recover or eliminate up to 95% of the VOC emissions. However, such systems or incinerators only reduce the VOC emissions by treating the effects, rather than the causes, of the problem. Moreover, the unrecovered 5% represents a large amount of VOCs emitted into the air. In fact, a gravure printing plant may release a million pounds or more of VOC emissions into the air annually, while fully complying with the government regulations.

One alternative to the recovery or disposal of VOC emissions is the reduction of emissions through the use of a waterborne gravure ink, i.e. an ink that combines an organic solvent, for example, an alcohol, with water in a solvent mixture. Such inks do in fact release far less VOCs emissions than organic solvent-based inks which do not include water. Still, the relatively large amount of the organic solvent required to reduce the surface tension to an acceptable level results in a waterborne ink having an undesirably high VOC content.

A further alternative is to use a water-based gravure ink, i.e., an ink that uses only water as the solvent and does not include an organic solvent. Aside from the difficulties realized in drying conventionally prepared waterbased publication gravure inks, these water-based inks provide poor print quality. The print is rough and grainy because the water "roughens" the paper by wetting and swelling the paper fibers. The print is also rough and grainy because the chemical formulation of the ink results in poor ink transfer to the paper, poor ink dot spreading on the paper and poor "trapping" or overprinting of one ink on another. Water-based gravure inks also exhibit what is known in the industry as galvanizing—a mottling appearance of light and dark color patches on the print substrate that is believed to be caused by the colorant not being finely dispersed in the ink and by the manner in which the water wets the paper.

Thus, to counteract the poor dispersion quality of true water-based inks, water-based publication gravure inks commonly include surfactants and defoamers to enhance the dispersion of the ink on paper. Unfortunately, these surfactants and defoamers are usually VOCs. Given that the surfactants and defoamers are generally inefficient and therefore must be present in relatively large concentrations, i.e., at least 2% by weight of the total weight of the ink, some of the advantages of using a water-based ink are lost.

Moreover, conventional water-based gravure inks require significantly more colorant than organic solvent-based inks. Press-ready organic solvent-based publication gravure inks typically include about 4 to about 6% by weight of colorant based on the total weight of the ink at printing. Conventional press-ready water-based publication gravure inks typically include about 16 to about 20% by weight of colorant based on the total weight of the ink at printing. Because the largest contribution to the cost of an ink comes from the cost of the colorant, the additional colorant required in the waterbased publication gravure inks increases their cost significantly.

A still further alternative is suggested in U.S. Pat. No. 4,722,963 to Whyzmuzis, wherein an aromatic dicarboxylic acid polyamide resin having an acid value greater than 35 is disclosed, such polyamide resin allegedly being useful in a flexographic/gravure ink binder (col. 2, lines 30-34). According to Whyzmuzis, an ink binder can be formed by dissolving the polyamide resin in an aqueous solvent containing ammonia or an organic amine (col. 5, lines 14-17). Furthermore, Whyzmuzis suggests that an ink can be prepared by dispersing a flexographic/gravure ink colorant in the binder (col. 5, lines 44-48).

However, the polyamide resin of Whyzmuzis is very hygroscopic, i.e. it readily absorbs moisture. Consequently, when the polyamide resin of Whyzmuzis is added directly to water as suggested in U.S. Pat. No. 4,722,963, even in the presence of ammonia or amines, the polyamide resin tends to flow together to form a solid chunk or blob, which then floats on the surface of the solution in the mixing vessel.

Moreover, Whyzmuzis only discloses a method of making a flexographic/gravure ink wherein a binder of polyamide resin is used. Whyzmuzis does not suggest a color dispersion wherein the colorant is dispersed in the polyamide resin without first making the binder. Further, Whyzmuzis does not suggest using the polyamide resin in combination with another resin, or using only a minor amount of the polyamide resin.

A water-based publication gravure ink having a low VOC content that provides the printing characteristics of a conventional, solvent-based publication gravure ink is highly desirable.

SUMMARY OF THE INVENTION

In one aspect of the present invention, a method of making a water-based publication gravure ink includes the steps of grinding a polyamide resin or a mixture of the polyamide resin and a second resin to produce a ground resin, mixing water, a base, the ground resin and a colorant to produce a mixture, milling the mixture to produce a color dispersion, and mixing the color dispersion with an emulsion and water to produce a press-ready ink. Additionally, the method may include the step of mixing the water, the base, and the ground resin to produce a dispersion medium. The method may also include the step of mixing the water and the base with a dispersant, and the step of adding a colorant to the water, the base and the dispersant to produce a colorant slurry.

In another aspect of the present invention, a method of making a water-based publication gravure ink includes the steps of mixing water, a base and a dispersant, adding a colorant and further mixing to produce a colorant slurry, grinding a polyamide resin or a mixture of the polyamide resin and a second resin to produce a ground resin, adding the ground resin to the colorant slurry and further mixing, milling to produce a slurry color dispersion, and mixing the color dispersion with an emulsion and water to produce a press-ready ink.

In a further aspect of the present invention, a water-based publication gravure ink is made as the product of the process including the steps of grinding a polyamide resin or a mixture of a polyamide resin and a second resin to produce a ground resin, mixing water, a base, the ground resin and a colorant to produce a mixture, milling the mixture to produce a color dispersion and mixing the color dispersion with an emulsion and water to produce a press-ready ink.

In still another aspect of the invention, a water-based publication gravure ink is made as the product of the process including the steps of mixing water, a base and a dispersant, adding a colorant and further mixing to produce a colorant slurry, grinding a polyamide resin or a mixture of polyamide resin and a second resin to produce a ground resin, adding the ground resin to the colorant slurry and further mixing, milling to produce a slurry color dispersion, and mixing the color dispersion with an emulsion and water to produce a press-ready ink.

In a still further aspect of the present invention, a water-based publication gravure ink includes water, a colorant, a mixture of a polyamide resin and a resin other than the polyamide resin, a base, and a dispersant.

Numerous other advantages and features of the present invention will become readily apparent from the following description of the preferred embodiments and the appended claims.

DESCRIPTION OF THE PREFERRED EMBODIMENTS

A water-based publication gravure ink includes water, a water dispersible/soluble polyamide resin, a base and a colorant. The publication gravure ink is suitable for printing on a printing substrate such as paper.

The polyamide resin is preferably alkali soluble, i.e., the polyamide resin is made water dispersible/soluble by an alkali (such as a neutralizing base), that neutralizes acid groups of the polyamide resin. The polyamide resin can be preneutralized, i.e., the acid groups of the polyamide resin are already neutralized prior to mixing with other components of the ink, or the polyamide can be neutralized in-situ, i.e., the acid groups are neutralized in the presence of one or more of the other components of the ink. Neutralization of the acid groups results in the polyamide resin being made water dispersible or soluble depending on the degree of neutralization. Neutralization and its affect on dispersibility and solubility are discussed in more detail hereinafter in connection with the neutralizing base.

The ink includes the polyamide resin, the water and the colorant in a color dispersion. In a preferred embodiment, a slurry of the water and colorant is combined with the polyamide resin to produce a colorant in polyamide resin color dispersion (hereinafter "slurry color dispersion"). Most preferably, the slurry includes a surfactant or dispersant that is presently theorized to wet the colorant particles and then, when the polyamide is added, draw the polyamide resin around the colorant particles to wet the color particles. This produces a colorant dispersion having very fine colorant particles. Surrounding the colorant particles with the polyamide resin inhibits agglomeration of the colorant particles. If the polyamide resin is not preneutralized, the slurry also includes the neutralizing base. The particle size of the dispersed colorant of the slurry color dispersion is preferably in the range of about 0.1 to about 0.75 microns.

In one embodiment, a dispersant medium including the neutralized polyamide resin and water is mixed with the colorant to produce a color dispersion (hereinafter "medium color dispersion"). Most preferably, the medium color dispersion includes the surfactant or dispersant. The particle size of the dispersed colorant of the medium color dispersion is preferably in the range of about 0.1 to about 1.0 microns. It is presently theorized that the colorant particles of the slurry color dispersion are finer than the colorant particles of the medium color dispersion because the colorant is slurried prior to mixing with the polyamide resin. This would produce a particle distribution with an average particle size less than 0.5 micron for the slurry color dispersion compared to greater than 0.5 microns for the medium color dispersion.

In another embodiment, a conventional resin for inks replaces some of the polyamide resin of the color dispersion.

In a further embodiment, the conventional resin replaces most of the polyamide resin. The polyamide resin of this embodiment is used as an additive to the color dispersion and is present in an amount effective to wet the colorant, the amount being up to about 10 wt % based on the total weight of the color dispersion.

In yet another embodiment, the conventional resin replaces all of the polyamide resin of the dispersant medium to produce a conventional dispersant medium that is free of the polyamide resin and which is then mixed with the polyamide resin and the colorant.

In yet a further embodiment, the conventional resin replaces all of the polyamide resin of the dispersant medium to produce a conventional dispersant medium that is free of the polyamide resin and which is then mixed with the colorant to produce a conventional color dispersion. The polyamide resin is then mixed with the conventional color dispersion.

As compared to conventional water-based publication gravure inks that do not include the polyamide resin, the present water-based publication gravure inks that include the polyamide resin exhibit improved dispersing of the colorant in the ink, a finer colorant dispersion, improved wetting of the colorant and a reduction in the amount of the colorant required (by up to about 50 weight percent) while being capable of producing inks having the same color strength as the conventional water-based publication gravure inks. The above advantages are particularly noticeable with the slurry color dispersion.

The polyamide resin also improves the gloss, rub resistance, abrasion resistance, printing smoothness, trapping (overprinting) and print density of the publication gravure ink. Additionally, the polyamide resin is theorized to be responsible for the ink not galvanizing. The above advantages are particularly noticeable with the slurry color dispersion.

Optional components of the publication gravure ink include the conventional resins, the neutralizing base for the polyamide resin or conventional resin, the surfactant, the dispersant, the conventional dispersant medium described above and the conventional color dispersion described above.

The conventional resins are water dispersible/soluble and have acid groups that can be neutralized and are well known in the printing industry.

The neutralizing base partially or completely neutralizes the acid groups of the polyamide or conventional resins. When the resin is completely neutralized, i.e., all of the acid groups are neutralized, the resin becomes water soluble. When the resin is partially neutralized, i.e., all of the acid groups are not neutralized, the resin becomes water dispersible. The polyamide resin and/or the conventional resin can be premixed with the neutralizing base prior to mixing with the remaining components. Alternatively, the neutralizing base is mixed with the other components prior to mixing with the polyamide resin or the conventional resin. In a further embodiment, the neutralizing base is mixed with all of the components.

The surfactant and dispersant wet the colorant to facilitate the colorant entering the color dispersion. In particular, the surfactant and dispersant help draw the polyamide resin about the colorant to achieve a fine colorant particle size.

The color dispersion includes the polyamide or conventional resin in an amount in the range of about 30 to about 50 weight percent (wt %), the colorant in an amount in the range of about 10 to about 30 wt %, water in an amount in the range of about 30 to about 50 wt %, the neutralizing base in an amount in the range of 0 to about 5 wt %, the surfactant in an amount in the range of 0 to about 1 wt % and the dispersant in an amount in the range of 0 to about 1.5 wt %, the weight percents being based on the total weight of the color dispersion. The color dispersion preferably contains at least about 5 wt % of the polyamide resin, based on the total weight of the color dispersion.

The pH of the color dispersion is preferably in the range of about 7.5 to about 10.

Preferably, the dispersant medium contains the polyamide and/or conventional resin in an amount in the range of about 25 to about 40 wt %, the neutralizing base in an amount in the range of about 1.0 to about 5.0 wt % and water in an amount in the range of about 50 to about 65 wt %, the wt % being based on the total weight of the dispersant medium. The dispersant medium preferably contains at least about 5 wt % of the polyamide resin, based on the total weight of the color dispersion.

The dispersant medium is slightly alkaline and preferably has a pH in the range of about 7.5 to about 9.

An uncut ink is prepared by admixing about 70 to about 80 wt % of the polyamide-containing color dispersion with about 20 to about 30 wt % of a conventional emulsion for inks. The uncut ink preferably has a viscosity of about 30 seconds on a Shell Cup #2.

Prior to printing, the uncut ink is cut (mixed) with water to preferably reduce the viscosity to 20 seconds or less on a Shell Cup #2. Typically, the cut ink includes about 70 wt % uncut ink and about 30 wt % additional water. The polyamide resin is preferably present in the cut ink in an amount in the range of about 25 to about 40 wt %, based on the total weight of the cut ink. The weight ratio of the polyamide resin to colorant in the ink is preferably in the range of about 2:1 to about 5:1.

The colorant content of the ink at printing is in the range of about 4 to about 8 wt %, based on the total weight of the ink, which is approximately the same amount as present in solvent-based publication gravure inks but about half the amount that is in conventional water-based publication gravure inks.

The volatile organic compound (VOC) content of the cut ink is preferably in the range of 0 to 5 wt % based on the total weight of the ink.

Polyamide resins such as those disclosed in the aforementioned Whyzmuzis patent and that have conventionally been made water soluble are suitable for use herein. Polyamide resins having characteristics similar to those of the polyamide resins disclosed in Whyzmuzis and that have been made water soluble are also suitable. These characteristics include the polyamide resin being prepared from an aromatic dicarboxylic acid which is substantially free of dimeric or higher polymeric fatty acids. The polyamide resin also preferably has a high acid value (preferably greater than about 35 percent) and is alkali soluble. It is presently theorized that the high acid number makes the polyamide resin compatible with conventional resins used in water-based publication gravure inks and enables the polyamide resin to be substituted therefore.

A representative polyamide resin is commercially available from Henkel Corp., Ambler, Pa., under the trade designation GAX 12-513.

The colorant is conventional and readily commercially available. Representative colorants include colorants and dyes.

The conventional resin is compatible with the other components of the ink and is water dispersible or soluble. Suitable conventional resins include acrylic, styrenated acrylic, polyester resins, the like and mixtures thereof. Representative conventional acrylic resins include acrylic solution polymers such as GCRYL-5102 and GCRYL-5005, both of which are commercially available from Henkel, Rohm & Haas E3000, S. C. Johnson SCX 686, S. C. Johnson Joncryl 690, Air Products Vancryl 68, and AKZO-Nobel Representative neutralizing bases include ammonium hydroxide, dimethylethanolamine, the like and mixtures thereof.

A representative surfactant is Surfanol CT-111 commercially available from Air Products.

Representative dispersants are Tamol 731-N commercially available from Rohm & Haas and Disperbyk 182 commercially available from Byk Chemie.

Representative emulsions are GCRYL 1239 and GCRYL 1256 commercially available from Henkel Corp., Johncryl 89 commercially available from S. C. Johnson, CL105 commercially available from Rohm & Haas AKZONobel AQUATECH HD-100, and 2160 and SCX 1160 commercially available from S. C. Johnson.

The water is preferably deionized or distilled water.

The color dispersion and the conventional color dispersion are made using a mill disperser through which the components are run until a substantially homogenous color dispersion is produced. A representative mill disperser is a Dynomill Horizontal Bead Mill Disperser.

The dispersant medium is made by mixing the components at room temperature, i.e., a temperature in the range of about 20° to about 35° C.

A method of using the water-based publication gravure ink includes the steps of introducing the water-based publication gravure ink into cells of a publication gravure printing substrate and transferring the ink from the cells to a print substrate.

The following examples are provided by way of illustration and not limitation.

EXAMPLE 1

WATER-BASED PUBLICATION GRAVURE INK
MADE USING A SLURRY COLOR DISPERSION

In one set of tests, a water-based publication gravure ink of the present invention was prepared using a slurry color dispersion with a polyamide resin. Unless otherwise indicated, all percentages referred to in this Example are taken with respect to the total weight of the slurry color dispersion and expressed as wt %. 27.31 wt % of water, 14.29 wt % of a commercially available ammoniated water solution (the solution containing 28% by weight of ammonia), 0.2 wt % of a dispersant commercially available from Rohm & Haas as Tamol 731-N, and 0.6 wt % of a surfactant commercially available from Air Products as Surfanol CT-111 were mixed in a suitable vessel. Alternatively, an amine, for example, such as ethanolamine or dimethylamine, can be substituted for some or all of the ammoniated water solution used in this embodiment of the present invention. However, the amine should be preferably no more than 1–3 wt %.

After the ammoniated water, dispersant, and surfactant were mixed thoroughly, 20 wt % yellow or black colorant was introduced into the vessel. The resulting color slurry was then mixed for approximately thirty minutes and heated to no more than 150 degrees F.

In a separate procedure, a polyamide resin, commercially available from Henkel Corp. as GAX 12-513, was prepared for combination with the color slurry. Specifically, 37.6 wt % of the polyamide resin was placed in a high shear rate grinder, and ground to achieve an average particle size of 1 to 20 microns. After grinding, the polyamide resin was introduced into the vessel containing the color slurry, and mixed for an additional thirty minutes.

The contents of the vessel were then run through a Dynomill Horizontal Bead Mill Disperser for approximately thirty minutes to produce a slurry color dispersion. An uncut (uncut with water) ink was prepared by mixing 75 wt % (taken with respect to the total weight of the uncut ink) of the slurry color dispersion with 25 wt % (taken with respect to the total weight of the uncut ink) of a let-down emulsion in a suitable vessel. Most preferably the let-down emulsion is an emulsion commercially available from Rohm & Haas as CL105, but emulsions such as GCRYL 1256 commercially available from Henkel Corp. may also be used.

A press-ready water-based publication gravure ink was then prepared by mixing 70 wt % (taken with respect to the total weight of the press-ready ink) of the uncut ink with 30 wt % (taken with respect to the total weight of the press-ready ink) of water, thereby reducing the viscosity to 20 seconds on a Shell Cup #2. A yellow and a black ink were prepared according to this method, and showed gloss and color strength performance equal or greater than that achieved using an organic solvent publication gravure ink.

Consequently, an acceptable press-ready ink has been prepared according to this method with a total colorant content of about 11 wt % (taken with respect to the total weight of the press-ready ink). Moreover, because this ink has a viscosity of 20 seconds, and because publication gravure inks normally run at 14 to 17 seconds, less colorant could have been used (about 6 to 8 wt % taken with respect to the total weight of the press-ready ink) while obtaining acceptable color strengths. This is a particularly significant reduction in the amount of colorant necessary to produce a given color strength, especially when it is considered that conventional water-based inks require at least 30 wt % colorant in the colorant dispersion.

EXAMPLE 2

WATER-BASED PUBLICATION GRAVURE INK
MADE USING A SLURRY COLOR DISPERSION
AND A HYBRID RESIN

In another set of tests, a water-based publication gravure ink of the present invention was prepared using a slurry color dispersion with a hybrid mixture of a polyamide resin and a resin other than the polyamide resin. Unless otherwise indicated, all percentages referred to in this Example are taken with respect to the total weight of the slurry color dispersion and expressed as wt %. 27.31 wt % of water, 14.29 wt % of a commercially available ammoniated water solution (the solution containing 28% by weight of ammonia), 0.2 wt % of a dispersant commercially available from Rohm & Haas as Tamol 731-N, and 0.6 wt % of a surfactant commercially available from Air Products as Surfanol CT-111 were mixed in a suitable vessel. Alternatively, an amine, for example, such as ethanolamine or dimethylethanolamine, can be substituted for some or all of the ammoniated water solution used in this embodiment of the present invention. However, the amine should be preferably no more than 1–3 wt %.

After the ammoniated water, dispersant, and surfactant were mixed thoroughly, 20 wt % yellow or black colorant was introduced into the vessel. The resulting color slurry was then mixed for approximately thirty minutes and heated to no more than 150 degrees F.

In a separate procedure, a polyamide resin, commercially available from Henkel Corp. as GAX 12-513, was prepared for combination with the color slurry. Specifically, 37.6 wt % of a mixture of the GAX 12-513 polyamide resin and a second resin was placed in a high shear rate grinder, and ground to achieve an average particle size of 1 to 20 microns. Preferably, the ratio of polyamide resin to the second resin may vary between 90:10 to 10:90, with the most preferable ratio being 90:10. Additionally, while the second resin is most preferably E3000 commercially available from Rohm & Haas, other resins may be used, such as GCRYL 5005 commercially available from Henkel Corp. and SCX-686 commercially available from S. C. Johnson. After grinding, the resin mixture was introduced into the vessel containing the color slurry, and mixed for an additional thirty minutes.

The contents of the vessel were then run through a Dynomill Horizontal Bead Mill Disperser for approximately thirty minutes to produce a slurry color dispersion.

An uncut (uncut with water) ink was prepared by mixing 75 wt % (taken with respect to the total weight of the uncut ink) of the slurry color dispersion with 25 wt % (taken with respect to the total weight of the uncut ink) of a let-down emulsion in a suitable vessel. Most preferably the let-down emulsion is an emulsion commercially available from Rohm & Haas as CL105, but other emulsions may also be used, such as GCRYL 1256 commercially available from Henkel Corp.

A press-ready water-based publication gravure ink was then prepared by mixing 70 wt % (taken with respect to the total weight of the press-ready ink) of the uncut ink with 30 wt % (taken with respect to the total weight of the press-ready ink) of water, thereby reducing the viscosity to 20 seconds on a Shell Cup #2. A yellow and a black ink were prepared according to this method, and showed gloss and color strength performance equal or greater than that achieved using an organic solvent publication gravure ink.

Consequently, an acceptable press-ready ink has been prepared according to this method with a total colorant content of about 11 wt % (taken with respect to the total weight of the press-ready ink). Moreover, because this ink has a viscosity of 20 seconds, and because publication gravure inks normally run at 14 to 17 seconds, less colorant could have been used (about 6 to 8 wt % taken with respect to the total weight of the press-ready ink) while obtaining acceptable color strengths. This is a particularly significant reduction in the amount of colorant necessary to produce a given color strength, especially when it is considered that conventional water-based inks require at least 30 wt % colorant in the colorant dispersion.

EXAMPLE 3

WATER-BASED PUBLICATION GRAVURE INKS MADE USING A MEDIUM COLOR DISPERSION

In a further set of tests, two water-based gravure publication inks of the present invention were prepared by first making a dispersant medium, which was then combined with the colorant to produce a medium color dispersion, i.e. a color dispersion in a dispersant medium. All percentages referred to in this Example are expressed as weight percent, abbreviated wt %.

The dispersant medium was prepared by mixing 31.3 wt % (taken with respect to the total weight of the dispersant medium) of a polyamide resin, preferably GAX 12-513, 58.1 wt % (taken with respect to the total weight of the medium) water and 10.6 wt % (taken with respect to the total weight of the medium) ammoniated water solution (the solution containing 28% by weight of ammonia) in a suitable vessel. Prior to mixing the components of the medium together, the polyamide was placed in a high shear rate grinder, and ground to achieve an average particle size of 1 to 20 microns.

Additionally, a small amount of a dispersant and/or a surfactant may be added to the dispersant medium. For example, 0.2 wt % of a dispersant commercially available from Rohm & Haas as Tamol 731-N, and 0.6 wt % of a surfactant commercially available from Air Products as Surfanol CT-111 may be added to the dispersant medium.

The two medium color dispersions were prepared using the dispersion medium described above. One medium color dispersion was prepared using a yellow colorant commercially available from Heubach, the second was prepared using Eltex 5 black colorant commercially available from Cabot. To create either of these medium color dispersions, 40 wt % (taken with respect to the total weight of the medium color dispersion) dispersion medium, 40 wt % (taken with respect to the total weight of the color dispersion) water and 20 wt % (taken with respect to the weight of the color dispersion) colorant were heated to not greater than 150 degrees F., and then run through a Dynomill Horizontal Bead Mill Dispenser for approximately forty-five minutes.

Two uncut (uncut with water) inks were then prepared by mixing 75 wt % (taken with respect to the total weight of the uncut ink) medium color dispersion with 25 wt % (taken with respect to the total weight of the uncut ink) of a let-down emulsion in a suitable vessel. Most preferably, emulsions such as GCRYL 1256 commercially available from Henkel Corp. may be used.

Press-ready yellow and black water-based publication gravure ink was then prepared by mixing 70 wt % (taken with respect to the total weight of the press-ready ink) uncut ink with 30 wt % (taken with respect to the total weight of the press-ready ink) water, thereby reducing the viscosity to 20 seconds on a Shell Cup #2. To achieve an acceptable ink, the press-ready ink must be made within three hours of the mixing of the dispersion medium.

The inks were run on a Cerutti Packaging, Inc. test press using coated and uncoated paper. Except for the line speed, the test press simulated publication gravure printing. The yellow ink printed with acceptable print density and smoothness on both papers, but the gloss was low. The black ink did not print well on the coated paper, but did print acceptably on the uncoated paper. However, even with the uncoated paper, the gloss was still low.

The black ink was diluted even further by adding more water, to yield a press-ready ink with a viscosity of 14 seconds and a total colorant content to about 8 wt % (taken with respect to the total weight of the press-ready ink). The print density of this black ink on uncoated paper was 1.24, which is acceptable for uncoated paper.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A method of making a water-based publication gravure ink comprising polyamide resin wherein the tendency of the polyamide resin to aggregate into a water-insoluble mass is overcome, the method comprising the steps of:

grinding a polyamide resin having a tendency to aggregate into a water-insoluble mass to produce a ground resin;

mixing water, a base, the ground resin and a colorant;

heating the water, the base, the ground resin and the colorant to a temperature not greater than about 150° F.;

milling the water, the base, the ground resin and the colorant to produce a color dispersion; and mixing the color dispersion with an emulsion and water to produce an ink.

2. The method of claim 1, wherein the grinding step includes grinding the ground resin to an average particle size of 1 to 20 microns.

3. The method of claim 1, further comprising the step of mixing the water, the base, and the ground resin to produce a dispersion medium.

4. The method of claim 1, further comprising the step of mixing the water, the base and a dispersant.

5. The method of claim 4, further comprising the step of adding a colorant to the water, the base and the dispersant, and further mixing to produce a colorant slurry.

6. A method of making a water-based publication gravure ink comprising a polyamide resin wherein the tendency of the polyamide resin to aggregate into a water-insoluble mass is overcome, the method comprising the steps of:

mixing water, a base and a dispersant;

adding a colorant and further mixing to produce a colorant slurry;

grinding a polyamide resin having a tendency to aggregate into a water-insoluble mass to produce a ground resin;

adding the ground resin to the colorant slurry and further mixing;

heating the colorant slurry including the ground resin to a temperature not greater than about 150° F.;

milling the colorant slurry including the ground resin to produce a slurry color dispersion; and mixing the color dispersion with an emulsion and water to produce an ink.

7. A method of making a slurry color dispersion comprising a polyamide resin wherein the tendency of the polyamide resin to aggregate into a water-insoluble mass is overcome, the method comprising the steps of:

mixing about 27% by weight water, about 14% by weight base and about 1% by weight dispersant;

adding about 20% by weight colorant and further mixing to produce a colorant slurry;

grinding about 38% by weight of a polyamide resin having a tendency to aggregate into a water-insoluble mass to produce a ground resin;

adding the ground resin to the colorant slurry and further mixing;

heating the colorant slurry including the ground resin to a temperature not greater than about 150° F.;

milling the colorant slurry including the ground resin to produce a slurry color dispersion; and mixing the color dispersion with an emulsion and water to produce an ink.

* * * * *